Feb. 8, 1966  J. V. SELZER  3,233,941
COMBINED RELEASABLE SEAT AND SHOULDER STRAP BELT
Filed March 14, 1963
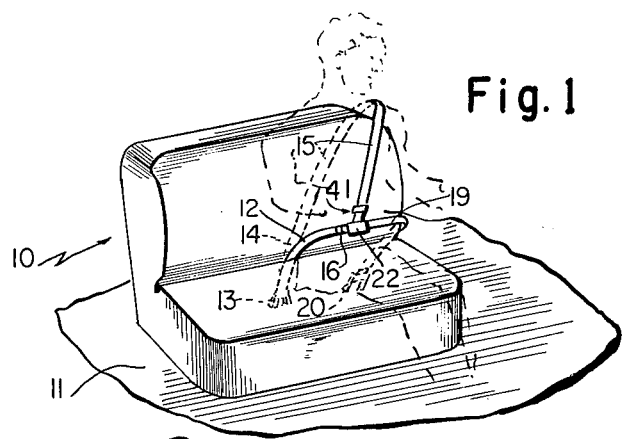
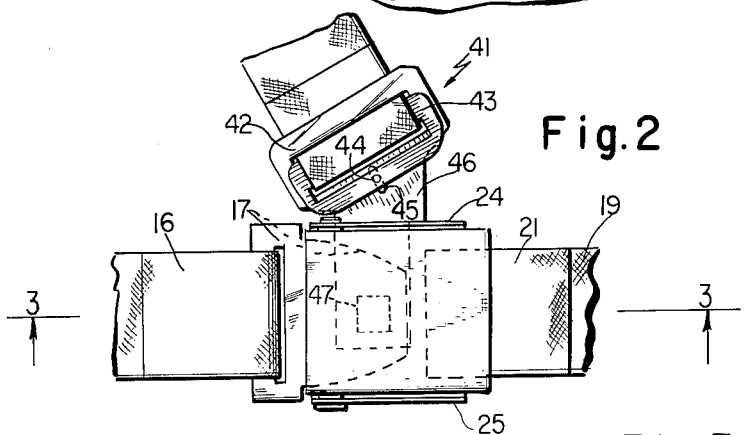
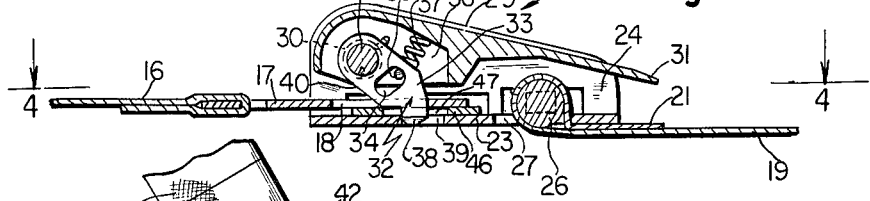
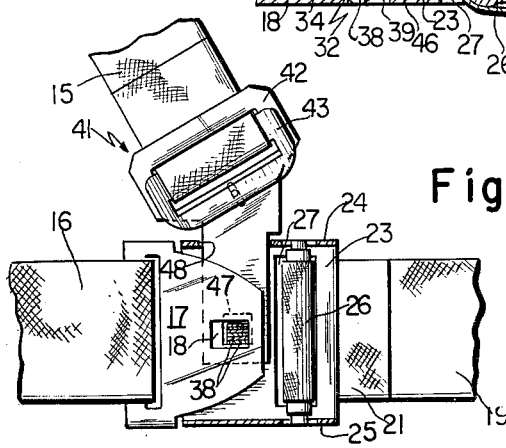
INVENTOR.
JOHN V. SELZER
BY
Robertson *my* Smythe
ATTORNEYS

United States Patent Office 3,233,941
Patented Feb. 8, 1966

3,233,941
COMBINED RELEASABLE SEAT AND SHOULDER STRAP BELT
John V. Selzer, Brooklyn, N.Y., assignor to Atlas Safety Equipment Company, Inc., Brooklyn, N.Y., a corporation of New York
Filed Mar. 14, 1963, Ser. No. 265,173
2 Claims. (Cl. 297—389)

The present invention relates to seat belts for vehicles and the like, and particularly to a combined seat belt and shoulder harness for preventing the wearer from being thrown forward when the vehicle in which he is located suddenly decelerates or stops.

The principal object of the invention is to provide a combined seat belt and shoulder harness that will be simple to manipulate.

Another object of the invention is to provide such a combined seat belt and shoulder harness in which a single quick release buckle is employed.

Still another object of the invention is to provide such a combined seat belt and shoulder harness in which the single quick release buckle is so designed that the forces restrained by the seat belt and shoulder harness act on the buckle independently of any force required to open it.

In one aspect of the invention, the one end of a seat strap may be firmly anchored to the frame of the vehicle in which a seat is located. The one end of another seat strap may be firmly anchored to the frame, and a quick release buckle means may be attached to the free ends of said seat straps.

In another aspect of the invention, a shoulder strap may have its one end connected to one of the seat straps, and it may be arranged to pass over the back of the seat, thence over one of the wearer's shoulders and down across his chest.

In still another aspect of the invention, the free end of the shoulder strap may be connected to a tongue member adapted releasably to be connected to the quick release buckle means connected between the free ends of the seat straps.

In a still further aspect of the invention, the quick release buckle means may comprise a base having a pivot pin at its one end to which a release plate is pivotally attached, and a recess at its other end, parallel with said pivot pin, in which recess a knurled roller is located that cooperates adjustably with the free end of one of the seat belts to hold the buckle means to the belt.

In still another aspect of the invention, the release plate may support a pivotal detent, the effective end of which is spring urged away from the plate and adapted to pass through a hole within the base. The construction is such that an apertured plate fixed to the free end of the other seat strap can be passed through a slot beneath the pivot pin on the base so as to raise the spring pressed detent, whereupon the latter passes through the aperture in the plate as well as the hole in the base, thus locking the plate and buckle means together.

In still another aspect of the invention, a slot is provided in one side wall of the base between the knurled roller and the pivot pin. The spring pressed detent is provided with a cam surface facing said slot, the construction being such that another apertured plate member attached to the free end of the shoulder strap can be passed through said slot to cooperate with the spring pressed detent to effectively lock it to the releasable buckle means.

The above, other objects and novel features of the invention will become apparent from the following specification and accompanying drawing which is merely exemplary.

In the drawing:
FIG. 1 is a perspective view of a seat to which the principles of the invention have been applied;
FIG. 2 is an enlarged plan view of a releasable buckle means to which the principles of the invention have been applied;
FIG. 3 is a sectional view taken substantial along line 3—3 of FIG. 2; and
FIG. 4 is a sectional plan view taken substantially along line 4—4 of FIG. 3.

Referring to the drawing, the principles of the invention are shown as applied to a seat 10 securely anchored to a platform 11 of a vehicle or other transportation apparatus. One end of a seat strap 12 is fixed to a fitting 13 rigidly attached to the platform 11. One end 14 of a shoulder strap 15 is fixed to the seat strap 12 near its anchored end. The free end 16 of seat strap 12 is permanently secured to a plate 17 having an aperture 18 therein for a purpose to be described hereafter.

One end of another seat strap 19 is securely fixed to a fitting 20 also attached to the platform 11. The free end 21 of strap 19 is adjustably connected to a releasable buckle means 22. The buckle means 22 may include a base 23 having parallel upstanding side walls 24, 25 between which a non-rotatable, cylindrical member 26 may be located for limited sliding movement. The free end 21 of seat strap 19 may be threaded around member 26 and through a slot 27 in base 23, receiving said member in a manner to provide an adjustable connection between the end 21 and base 23.

A pivot pin 28 may extend between the side walls 24, 25 and it may pivotally support a release plate 29. A spring 30 may be provided for urging the free end 31 of the release plate toward the base 23. A spring pressed detent 32 may be mounted on the pivot pin 28 and it may comprise a plurality of thin plate elements 33 (FIG. 3), each having an elongated aperture 34 therein through which a pin 35 extends and is anchored in walls 36 forming part of plate 29. A spring 37 is mounted between plate 29 and detent 32 for urging the latter in a clockwise direction about pin 28. Each of the plates 33 may include a nose 38 adapted to pass through a hole 39 within the base 23. The construction of the plates 33 forming detent 32 is such that an inclined portion 40, forming a cam surface, is located between the pin 28 and base 23. The arrangement is such that as plate 17 is slid along the base beneath the pin 28, it acts on cam surface 40, raising detent 32 so that nose portion 38 will pass through aperture 18 to thereby lock the plate 17 to base 23.

A buckle means 41 may be adjustably fixed to the end of shoulder strap 15 opposite that connected to seat strap 12. Buckle means 41 may include a plate 42 having an opening therein adapted to receive the free end of the shoulder strap 15. It also may include a slotted member 43 that is attached to plate 42 by a pin 44 that extends through an elongated slot 45 in plate 42. The arrangement is such that the free end of shoulder strap 15 can be fed upwardly through the opening in plate 42 and the slot in member 43, thence over the leg of member 43 formed by said slot, and downwardly through the opening in plate 42. Then, as tension is applied between strap 15 and plate 42, member 43 slides on plate 42 in a manner to hold securely the free end of strap 15 to the plate 42.

Plate 42 may also include an angularly disposed extension 46 having an aperture 47 therein (FIG. 4) adapted to receive the nose 38 of detent 32. Referring to FIG. 4, the wall 24 of base 23 may include a slot 48 adjacent the base 23 for the reception of extension 46. The edges of plates 33 forming the detent 32 parallel to wall 24 may be beveled to provide a cam action between the end of extension 46 and detent 32 when the extension 46 is slid through slot 48 along the inside of base 23.

With the tongue plates 17 and 46 locked to the base 23 by nose 38 of detent 32 extending through the apertures in the plates, the turning of release plate 29 counterclockwise about pin 28 raises the nose 38 above plates 17 and 46, thereby permitting them to slide away from base 23 and release the wearer.

From the foregoing it is evident that a seat and shoulder strap arrangement has been provided in which a single releasable buckle means accommodates the tongue plates fixed to the free end of one of the seat straps and the free end of the shoulder strap.

Although the various features of the improved seat and shoulder strap buckle arrangement have been shown and described in detail to fully disclose one embodiment of the invention, it will be evident that changes may be made in such details and certain features may be used without others without departing from the principles of the invention.

What is claimed is:

1. In a combined releasable seat and shoulder strap arrangement comprising in combination, separate seat strap means adapted to have one end of each attached to a fixed member; a buckle attached to the free end of one of said seat strap means and including a base having parallel walls along the sides thereof; a pivot pin extending between said side walls; a release plate pivoted on said pin; spring pressed detent means pivotally mounted on said pin; shoulder strap means having one of its ends attached to one of said seat strap means; an apertured plate attached to each of the free ends of said one of said seat strap means and said shoulder strap means; walls defining a slot in one of said side walls adjacent said base and extending in parallel relation to said base for the reception of the apertured plate attached to the free end of said shoulder strap means at substantially right angles to said seat strap means; and cam means on said detent means adapted to cooperate with said strap plates to effect the location of said detent means within the apertures of said strap plates.

2. In a combined releasable seat and shoulder strap arrangement comprising in combination, separate seat strap means adapted to have one end of each attached to a fixed member; a buckle attached to the free end of one of said seat strap means and including a base having parallel walls along the sides thereof; means extending between said side walls at one end of said base and mounted for movement relative to said base, said free end of said one of said seat straps encircling said means in a manner to provide an adjustable connection therewith; a pivot pin extending between said side walls at the opposite end of said base; a release plate pivoted on said pin; spring pressed detent means pivotally mounted on said pin; shoulder strap means having one of its ends attached to one of said seat strap means; an apertured plate attached to each of the free ends of said one of said seat strap means and said shoulder strap means; walls defining a slot in one of said side walls adjacent said base and extending in parallel relation to said base for the reception of the apertured plate attached to the free end of said shoulder strap means at substantially right angles to said seat strap means; and cam means on said detent means adapted to cooperate with said strap plates to effect the location of said detent means within the apertures of said strap plates.

References Cited by the Examiner

UNITED STATES PATENTS

| | | | |
|---|---|---|---|
| 2,275,450 | 3/1942 | Manson | 297—389 |
| 2,430,985 | 11/1947 | King | 24—73.05 |
| 3,110,071 | 11/1963 | Higuchi | 24—230.1 |

FRANK B. SHERRY, *Primary Examiner.*